(12) United States Patent
Iwakiri et al.

(10) Patent No.: US 7,059,632 B2
(45) Date of Patent: Jun. 13, 2006

(54) GAS GENERATOR FOR PASSENGER SIDE AIR BAG

(75) Inventors: Toshiro Iwakiri, Hyogo (JP); Katsuhito Miyaji, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 228 days.

(21) Appl. No.: 10/448,132

(22) Filed: May 30, 2003

(65) Prior Publication Data

US 2004/0056460 A1 Mar. 25, 2004

(30) Foreign Application Priority Data

May 31, 2002 (JP) ............................. 2002-158961
Dec. 17, 2002 (JP) ............................. 2002-365161

(51) Int. Cl.
*B60R 21/26* (2006.01)
(52) U.S. Cl. ..................... 280/736; 280/741; 280/742
(58) Field of Classification Search ................ 280/741, 280/736, 740, 742; 102/531, 530
See application file for complete search history.

(56) References Cited

U.S. PATENT DOCUMENTS

| | | | |
|---|---|---|---|
| 5,564,743 A | 10/1996 | Marchant | |
| 6,183,006 B1 * | 2/2001 | Katsuda et al. | 280/741 |
| 6,224,098 B1 * | 5/2001 | Katsuda et al. | 280/741 |
| 6,890,002 B1 * | 5/2005 | Suehiro et al. | 280/741 |
| 2003/0146611 A1 * | 8/2003 | Kenney et al. | 280/736 |

FOREIGN PATENT DOCUMENTS

JP 3029326 U 7/1996
WO WO 01/40032 A1 6/2001

* cited by examiner

*Primary Examiner*—Eric Culbreth
(74) *Attorney, Agent, or Firm*—Birch, Stewart, Kolasch & Birch, LLP

(57) ABSTRACT

The invention provides a downsized gas generator for a passenger side air bag, which can supply a gas to the bag in at the time at which reaction force is most needed for restraining a vehicle occupant to be protected. The gas generator comprises a housing having a gas discharging port, an igniter to be activated by an impact, and a molded article of a gas generating agent to be ignited and burnt by the igniter for generating a combustion gas, wherein one, two, or three requirements selected from the following (a), (b), and (c) are met: (a) an internal volume of a gas generator is 200 to 400 $cm^3$; (b) a ratio L/D of an axial length L of a gas generator to a diameter D is 0.6 to 1.5; and (c) an amount of gas of a molded article of a gas generating agent is 1.5 to 4.5 mol.

17 Claims, 4 Drawing Sheets

GAS GENERATOR FOR PASSENGER SIDE AIR BAG

FIELD OF THE INVENTION

The present invention relates to a gas generator for an air bag and an air bag apparatus for protecting a vehicle occupant from an impact.

BACKGROUND OF THE INVENTION

A conventional gas generator used for a passenger side is composed by including and accommodating, in a housing having a gas discharging port, an ignition means to be activated by an impact sensor detecting an impact, a gas generating agent ignited and burnt by the ignition means to generate a combustion gas, and a filter means for cooling the combustion gas and/or arresting a combustion residue.

As such a gas generator for passenger side, for example, the one having a cylindrical shape described in JP-U No. 3,029,326 is known. This gas generator is quite long in the axial direction compared with the diameter, and the volume of the container is large. Therefore, there has been a demand for a gas generator for a passenger side which has a small axial length with respect to the diameter and a small volume to be easily installed in a vehicle.

SUMMARY OF THE INVENTION

An object of the present invention is to provide a gas generator for a passenger side which is downsized, having a smaller ratio of the axial length to the diameter and a smaller volume of the container, and an air bag apparatus for a passenger side using the same.

The invention provides, as a means to solve the problem, a gas generator for a passenger side air bag comprising a housing having a gas discharging port, an ignition means to be activated by an impact and a molded article of a gas generating agent to be ignited and burnt by the ignition means for generating a combustion gas, wherein one, two or three requirements selected from the following (a), (b) and (c) are met:

(a) an internal volume of a gas generator is 200 to 400 $cm^3$;

(b) a ratio L/D of an axial length L of a gas generator to a diameter D is 0.6 to 1.5; and (c) an amount of gas of a molded article of a gas generating agent is 1.5 to 4.5 mol.

By meeting the requirement (a), particularly the size can be reduced compared with a conventional gas generator for a passenger side. In the requirement (a), the volume is preferably 220 to 300 $cm^3$.

By reducing a volume of a gas generator in this manner, it becomes easy to install a gas generator into a vehicle. A shape of the gas generator meeting the requirement (a) can be cylindrical or disk-like.

By meeting the requirement (b), the entire shape of a gas generator is not in such a cylindrical shape that is long in the axial direction and having large L/D like a conventional one for a passenger side, but the side shape of the gas generator is an approximate square, which is preferable. L/D is preferably 0.7 to 1.2.

In particular, by meeting the requirement (b), a shape of the module case (metal portion) becomes simple compared with a cylindrical gas generator, and a weight and cost can be reduced. In addition, the production line of the gas generator for a passenger side can be used in common with a production line of a gas generator for a driver side.

In relation to the requirement (b), an axial length of the gas generator of the present invention is preferably 50 to 100 mm and, more preferably 50 to 80 mm. By reducing the axial length, interference to parts in the vicinity of a gas generator can be eliminated, and such a situation that a module case cannot be installed can be avoided.

By meeting the requirement (c), even if a gas generator is downsized, an air bag for a passenger side can be inflated to a sufficient extent to obtain safety of a vehicle occupant. The amount of gas of a molded article of a gas generating agent is preferably 2 to 4 mol and more preferably 2 to 3 mol or 3 to 3.8 mol. A shape of a gas generator meeting the requirement (c) can be cylindrical or disk-like.

The gas generator for a passenger side air bag of the present invention can be the one meeting the requirements (a) and (b), the one meeting the requirements (a) and (c), the one meeting the requirements (b) and (c), or the one meeting the requirements (a), (b) and (c).

In the gas generator for a passenger side air bag of the present invention, a housing having a gas discharging port comprises a combination of a diffuser shell having a gas discharging port and a closure shell, and a ratio (L2/L1) of an axial length (L2) of the closure shell to an axial length (L1) of the diffuser shell is preferably 0.5 to 1.5. L2/L1 is more preferably 0.8 to 1.2, and further more preferably 0.8 to 1.1.

In order to arrange a gas discharging port of a gas generator in a diffuser shell side, a certain level of height of a diffuser shell is necessary. Therefore, it is preferable to satisfy the above range of L2/L1.

In the gas generator for a passenger side air bag of the present invention, a housing having a gas discharging port comprises a combination of a diffuser shell having a gas discharging port and a closure shell, and a ratio (D2/D1) of a diameter (D2) of the closure shell to a diameter (D1) of the diffuser shell is preferably 0.8 to 1.2, more preferably 1.0 to 1.2, and further more preferably 1.0. In this case, D=(D2+D1)/2. It is preferable to arrange a gas discharging port in the diffuser shell side.

It is desirable that each of a diffuser shell and a closure shell has a flange extending outwardly in the radial direction at a joint portion. A gas generator is mounted to a module case at this flange portion, and a position of the flange in the axial direction is determined by the above ratio of L2/L1. Concretely, since a gas discharging port is arranged in a diffuser shell, the axial length (L1) of the diffuser shell can be, for example, 20 to 50 mm, and preferably 30 to 40 mm.

In the gas generator for a passenger side air bag of the present invention, a minimum thickness W (mm) of a molded article of a gas generating agent is preferably 0.8 to 2.2 mm, more preferably 0.8 to 2.0 mm, further more preferably 0.8 to 1.8 mm, and especially preferably 1.1 to 1.8 mm. If W is smaller than this range, the combustion time of a molded article of a gas generating agent is too short, and if W is larger than this range, the combustion time of a molded article of a gas generating agent is too long.

A molded article of a gas generating agent having the linear burning rate of, in particular, 7 to 30 mm/sec, preferably 7 to 15 mm/sec under the pressure of 70 $kg/cm^2$ can be used. As such a molded article of a gas generating agent, for example, one comprising a nitrogen containing organic compound, an oxidizer, and if required, an additive such as a binder or a slag-forming agent can be used.

In the gas generator for a passenger side air bag of the present invention, a molded article of a gas generating agent is preferably molded into a shape such as a pellet, a perforated shape and so on. By molding into such a shape, it becomes easy to adjust the thickness W or the surface area, and therefore, combustion control of a molded article of a gas generating agent can be easy.

In case of molding into a perforated shape, the shape can be a single-perforated shape, a perforated (porous) shape (not less than two perforations, the number of perforations being either even or odd number, including, for example, a shape having seven perforations) and so on. In this case, a single or multi-perforations may or may not penetrate through a molded article.

In this invention, as described below, by adjusting A/At, At/amount of gas, A/amount of gas, and further the above thickness of a gas generating agent (W) and the burning rate of a gas generating agent, as to a shape of inner pressure curve obtained by the tank combustion test, the peak time comes later than that of a conventional gas generator, and the time from the peak of the inner pressure to the point of one fourth of the peak (msec) becomes longer. Such a shape of a inner pressure curve is valuable in view of making it possible to obtain a reaction force of an air bag generated by a gas supplied to an air bag from a gas generator in time with the timing at which the reaction force is needed most, in particular, the latter half of combustion. As a result, a more downsized gas generator for a passenger side can be provided. In addition, by taking account of the timing of discharging a gas from a gas generator, an amount of gas can be reduced compared with a conventional gas generator for a passenger side. For example, as shown in the requirement (c), an amount of gas can be 2 to 3 mol.

In the gas generator for a passenger side air bag of the present invention, when a total surface area of molded articles of a gas generating agent is A ($cm^2$) and a total area of gas discharging ports is At ($cm^2$), A/At is preferably 500 to 1,000.

A/At is a ratio of a total surface area of molded articles of a gas generating agent A ($cm^2$) to a total area of gas discharging ports in a housing At ($cm^2$), and relates to a combustion inner pressure in a gas generator. A/At is preferably 500 to 1,000, more preferably 600 to 1,000 or 500 to 900, and further preferably 800 to 1,000.

When A/At exceeds a maximum value, a pressure in a gas generator rises excessively and a burning rate of a molded article of a gas generating agent becomes too large. On the other hand, when A/At does not reach the minimum value, a pressure in a gas generator becomes low, and a burning rate is too small. As a result, in any case, combustion time is not within a desirable range and a practical gas generator can not be provided.

In the gas generator for a passenger side air bag of the present invention, At/amount of gas, a ratio of a total area At ($cm^2$) of gas discharging ports to an amount of gas (mol), is preferably 0.3 to 1.0 ($cm^2$/mol).

At/amount of gas is a ratio of a total area At ($cm^2$) of gas discharging ports in a housing to an amount of gas (mol), and affects a combustion inner pressure. At/amount of gas is preferably 0.3 to 0.9, more preferably 0.5 to 0.8, and further preferably 0.5 to 0.7.

When At/amount of gas does not reach this range, an inner pressure rises too much, and on the other hand, when it exceeds this range, an inner pressure does not rise and enough combustion can not be obtained.

In the gas generator for a passenger side air bag of the present invention, A/amount of gas, a ratio of a total surface area A of molded articles of a gas generating agent to an amount of gas, is preferably 350 to 650 ($cm^2$/mol).

A/amount of gas is a ratio of a total surface area A ($cm^2$) of molded articles of a gas generating agent to an amount of gas (mol), and in the present invention, A/amount of gas is preferably 350 to 650 $cm^2$/mol and more preferably 400 to 600 $cm^2$/mol.

When A/amount of gas does not reach this range, an inner pressure in a gas generator does not rises, and when it exceeds this range, an inner pressure rises too high.

(Tank Combustion Test)

A gas generator for an air bag is fixed in a SUS (stainless steel) tank with an internal volume of 60 liters. After the tank is hermetically closed at a room temperature, the gas generator is connected to an external ignition electric circuit. A pressure transducer installed in the tank separately is used to measure a change in the increasing pressure in the tank and a change in pressure in the gas generator for a duration from 0 to 200 milliseconds, with the moment at which the ignition electric circuit switch is turned on (the ignition current is applied) taken as time 0 (zero). The measured data are then processed by a computer to generate a pressure/time curve (hereinafter referred to as a "inner pressure curve") which is used to evaluate the performance of the a molded article of a gas generating agent.

The invention provides, as another means to solve the problem, an air bag apparatus for a passenger side comprising a gas generator for an air bag, an impact sensor detecting an impact to activate the gas generator, an air bag introducing a gas generated in the gas generator to inflate, and a module case accommodating the gas generator, wherein the gas generator for an air bag is a gas generator for an air bag.

When a gas generator is an electric ignition type gas generator, for example, a semiconductor type acceleration sensor or the like, which is disposed outside of a console box, corresponds to an impact sensor. The semiconductor type acceleration sensor has four bridge-connected semiconductor strain gauges attached on a beam of silicon substrate that deflects when subjected to an acceleration. When an acceleration is applied, the beam deflects causing strain on its surface, which in turn change the resistance of the semiconductor strain gauges. The change in resistance is to be detected as a voltage signal proportional to the acceleration.

Especially, when an electric ignition type gas generator is used as a gas generator, a control unit disposed outside of the module case can be further included in the air bag apparatus. This is illustrated in FIG. 3. The control unit has an ignition decision circuit, which is supplied with a signal from the semiconductor type acceleration sensor. When the impact signal from the sensor exceeds a predetermined value, the control unit starts calculation. When the result of the calculation exceeds a predetermined value, the control unit outputs an activation signal to the gas generator.

In this air bag apparatus, the gas generator is activated upon the impact detected by the impact sensor to discharge a combustion gas from the gas discharging port. The combustion gas ejects into the air bag, and thereby the air bag inflates to break a module cover and forms a cushion absorbing the impact between a hard structure in the vehicle and an occupant.

A ratio of an amount of gas (mol) generated by combustion of a molded article of a gas generating agent to a volume (L) of an air bag is preferably 0.02 to 0.025 (mol/L).

In a conventional gas generator for an air bag, the relation of a volume of an air bag to gas amount introduced therein has not been considered. However, the air bag apparatus of the present invention supplies a gas minimally required to develop a bag.

As to a gas discharging port of an air bag apparatus, desirably, the gas discharging port in the housing is closed by an aluminum tape having width of 2 to 3.5 times of the diameter of the port in order to prevent moisture from invading from the outside into a housing. In attaching the aluminum tape, an adhesive aluminum tape, or an adhesive, preferably one which is melt by heating and secures, for example, hot melt system adhesive, can be used.

The gas generator of the present invention has a small ratio of an axial length to the diameter and a small volume of the container, so that it can be downsized.

PREFERRED EMBODIMENTS OF THE INVENTION

Below, the embodiments of the present invention are explained with drawings.

(1) Embodiment 1

Figure 1:
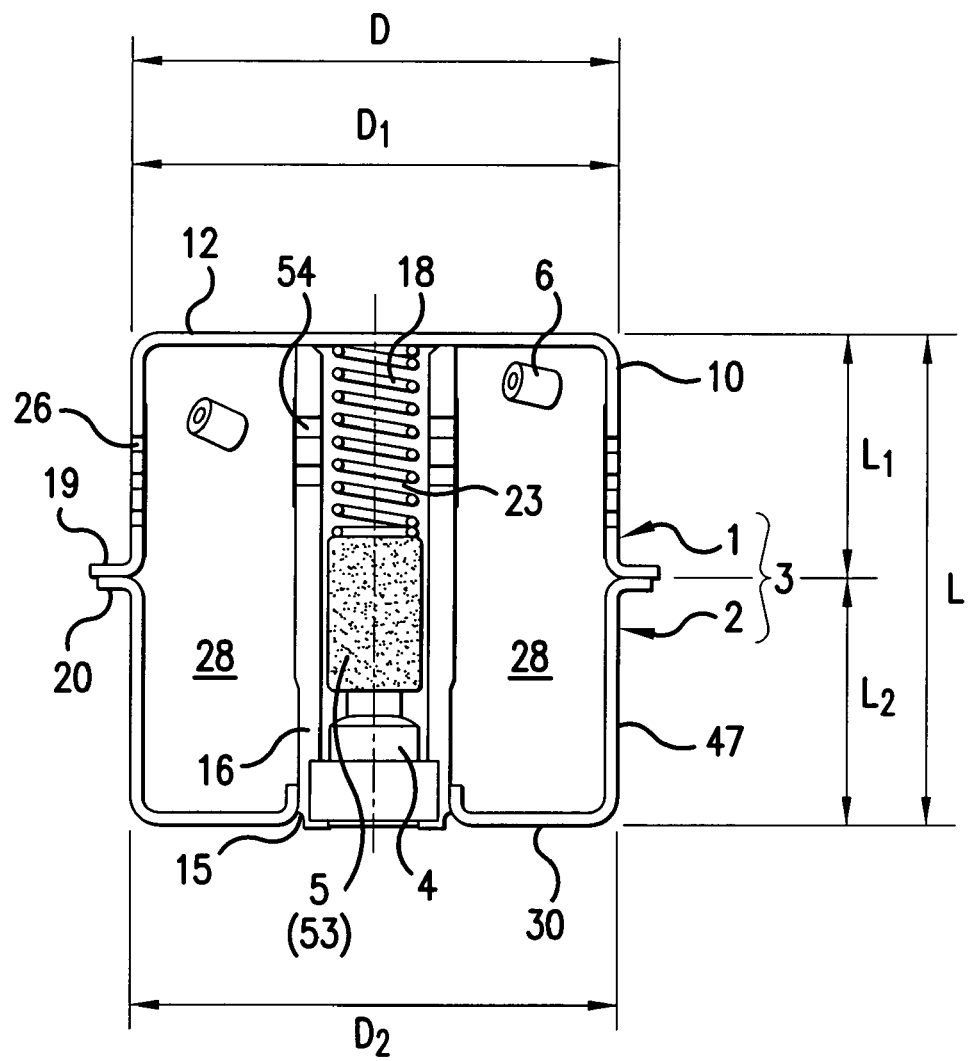
FIG. 1 is a cross section of a gas generator for an air bag.

FIG. 1 is a cross section of a gas generator for an air bag of the present invention. The gas generator includes a housing 3 comprising a diffuser shell 1 and a closure shell 2, an ignition means arranged in an accommodating space inside this housing 3, that is, an igniter 4 and a transfer charge 5, molded articles of a gas generating agent 6 which is to be ignited and burnt by these to generate a combustion gas, and a filter means, that is, a coolant/filter (not shown) defining a combustion chamber 28 accommodating these molded articles of a gas generating agent 6.

An internal volume of the gas generator (that is, an internal volume of housing 3; the requirement (a)) is 220 to 300 cm$^3$; a ratio L/D (the requirement (b)) of an axial length L of the gas generator to a diameter D of the gas generator is 0.7 to 1.2; an amount of gas of a molded article of a gas generating agent 6 (the requirement (c)) is 2 to 3 mol.

As thus described, meeting all of the requirements (a) to (c) is especially preferable in view of, in addition to downsizing the gas generating apparatus, securing a necessary gas amount to inflate the air bag and making the gas generator into a disk shape.

Figure 1A:
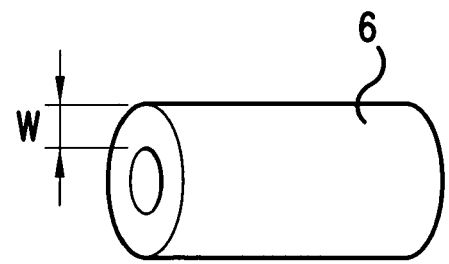
FIG. 1A depicts a molded article of a gas generating agent.

The minimum thickness W (mm) of a molded article of a gas generating agent 6 is preferably 0.8 to 1.8 mm and perforated shape with penetration or non-penetration such as a single-perforated cylinder or a perforated (porous) cylinder is desirable. This is illustrated in FIG. 1A, in which gas generating agent 6 and thickness W are represented schematically for illustrative purposes only.

As a molded article of a gas generating agent 6, one comprising 34 wt % of nitroguanidine, 50 wt % of strontium nitrate, 9 wt % of sodium salt of carboxymetylcellulose and 7 wt % of Japanese acid clay, can be used.

The diffuser shell 1 is molded by pressing a carbon steel plate, and comprises a circular portion 12, a circumferential wall portion 10 formed at an exterior circumferential portion of this circular portion 12, and a flange portion 19 extending outwardly in the radial direction from the end portion of this circumferential wall portion 10. Plural gas discharging ports 26 are provided on a circumferential wall portion. A/At is a ratio of a total surface area of molded articles of a gas generating agent A (cm$^2$) to a total area of gas discharging ports in a housing At (cm$^2$), and relates to a combustion inner pressure in a gas generator. A/At is 500 to 1,000, At/amount of gas is 0.5 to 0.8, and A/amount of gas is 400 to 600.

The closure shell 2 is molded by pressing a carbon steel plate, and comprises a circular portion 30, a central port 15 formed at the center of the circular portion 30, a circumferential wall portion 47 formed at exterior circumferential portion of the circular portion 30, and a flange portion 20 extending outwardly in the radial direction from the end portion of this circumferential wall portion 47. A central tubular member 16 is disposed engaged with this central port 15.

As to the diffuser shell 1 and the closure shell 2, the flange portion 19 of the diffuser shell and the flange portion 20 of the closure shell are overlapped in the vicinity of the axial central position of the housing 3, are laser welded, and are joined with each other to form the housing 3. L is 50 to 80 mm.

A ratio (L2/L1) of the axial length (L2) of closure shell 2 to the axial length (L1) of the diffuser shell 1 is 0.8 to 1.2. In this case, L is L2+L1.

A ratio (D2/D1) of the diameter (D2) of the closure shell to the diameter (D1) of the diffuser shell is 1.0 to 1.2. In this case, D=(D2+D1)/2.

A central tubular member 16 is made of a carbon steel tube having open ends, and one end is fixed to the diffuser shell 1 by resistance-welding. In the central tubular member 16, an ignition means accommodating chamber 23 is formed, and in this ignition means accommodating chamber 23, an igniter 4 to be activated by a signal from a sensor (not shown) and a transfer charge container 53 loading a transfer charge 5 to be ignited by the igniter 4.

The central tubular member 16 has penetrating ports 54 in the other end side, and a total of twelve penetrating ports 54 having the diameter of 3 mm are arranged circumferentially in two rows (six ports in each row with equal intervals).

In the gas generator of FIG. 1, the igniter 4 and the transfer charge 5 are accommodated in the central tubular member 16, and due to the relation of the output with an amount of a molded article of a gas generating agent 6, a space portion is formed at end portion in the diffuser shell 1 side inside the central tubular member 16. If such a space portion is left as it is, performance of the transfer charge may be affected due to the vibration etc., and therefore, a spring 18 is disposed in the space portion to fix the transfer charge 5.

(2) Embodiment 2

Figure 2:
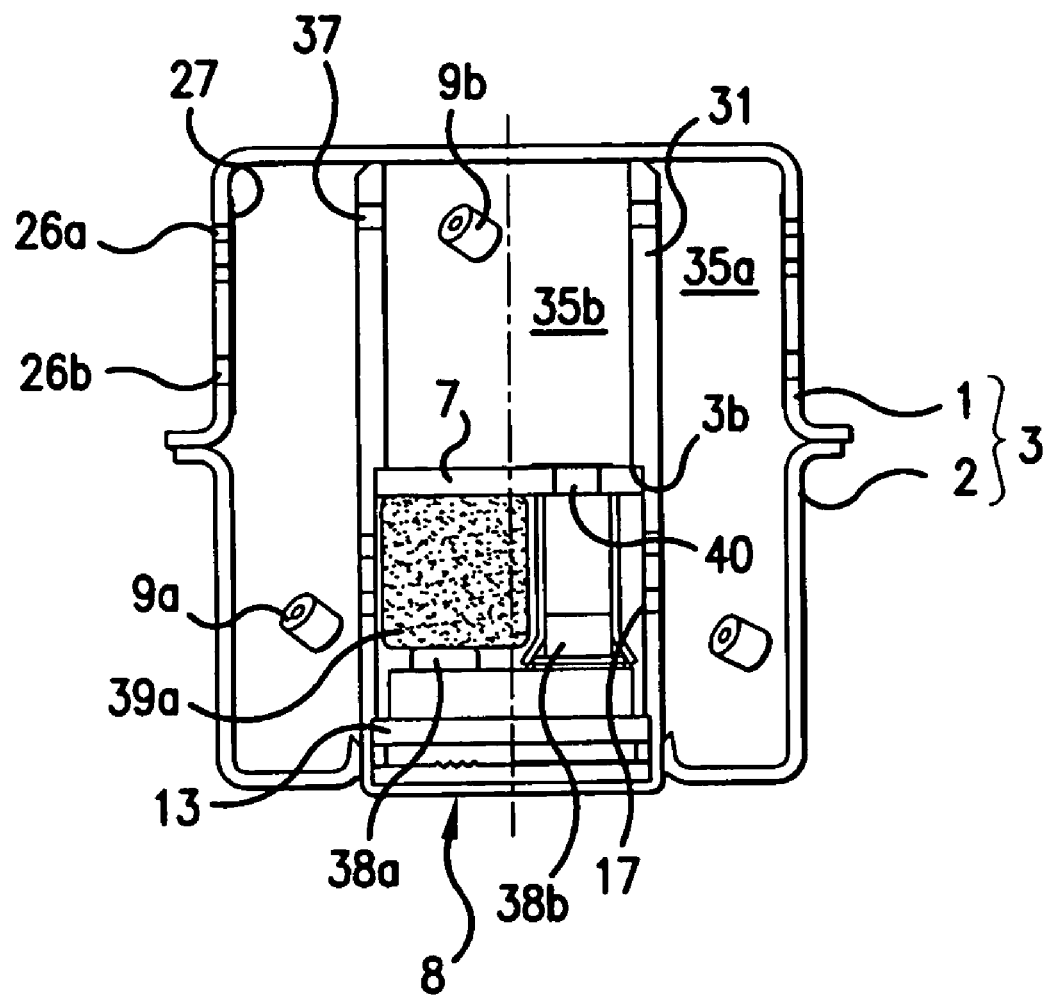
FIG. 2 is a cross section of a gas generator for an air bag.
Figure 3:
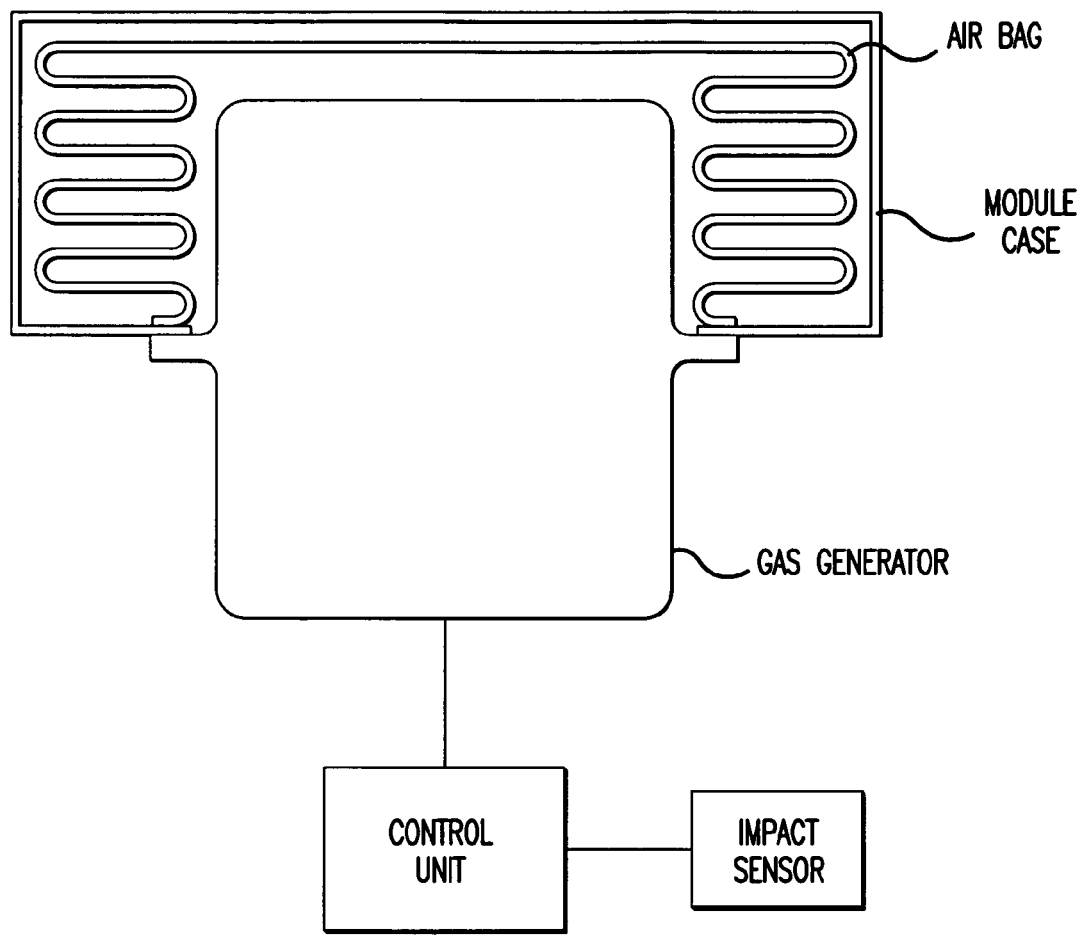
FIG. 3 depicts a control unit disposed outside of the module case of an air bag apparatus.

FIG. 2 is a vertical cross section of another embodiment of a gas generator for an air bag according to the present invention. Although not shown in FIG. 2, L, L1 and L2, and D, D1 and D2 in Embodiment 2 have the same meaning as those in Embodiment 1 (FIG. 1). In addition, each value including the requirements (a) to (c) have the same numerical range as Embodiment 1 unless being specified.

In this gas generator, a substantially tubular inner cylindrical member 31 is disposed in the housing 3 which is formed by joining a diffuser shell 1 having a gas discharging port and a closure shell 2 forming an inner accommodating space together with the diffuser shell 1, and a first chamber 35*a* is defined outside the inner cylindrical member.

In addition, a stepped-notch portion 36 is arranged on the interior of the inner cylindrical member 31, a disk-like partition wall 7 is disposed on the stepped-notch portion 36, and this partition wall 7 divides the inside of inner cylindrical member 31 into two chambers to form a second combustion chamber 35*b* in the diffuser shell 1 side and an ignition means accommodating chamber 8 in the closure shell 2 side.

As a result, in this gas generator, the first combustion chamber 35*a* and the second combustion chamber 35*b* are concentrically arranged in the housing 3, and are adjacent to each other in the radial direction of the housing 3. In these first and second combustion chambers, molded articles of a gas generating agent (9*a*, 9*b*), which is burnt by an ignition means activated upon receiving the impact and generates a combustion gas, are accommodated, and the ignition means accommodating chamber 8 accommodates the ignition means activated by the impact. In the inner cylindrical member 31 defining the first combustion chamber 35*a* and the second combustion chamber 35*b*, penetrating ports 37 are provided. In FIG. 2, gas generating agents 9*a* and 9*b* are represented schematically, for illustrative purposes only.

The ignition means 37 includes two electric ignition type igniters (38*a*, 38*b*) activated by an activation signal outputted due to detecting an impact by a sensor, and two igniters are fixed in a single initiator collar 13 by being embedded, aligned axially and parallel to each other and are installed, having head portions exposed.

In this gas generator, at activation, a flame, which is generated when the first igniter 38*a* is ignited (activated), ignites and burns the transfer charge 39*a* in the accommodating chamber, the flame passes through a flame transferring hole 17 formed on the inner cylindrical member 31, and ignites and burns a molded article of a gas generating agent 9*a* accommodated in the first combustion chamber 351 located in the radial direction of the accommodating chamber.

The flame of the second igniter 38*b* passes through flame transferring holes 40 arranged in the axial direction of the ignition means accommodating chamber 8, and ignites and burns a molded article of a gas generating agent 9*b* accommodated in the second combustion chamber 35*b* on the extension thereof.

Particularly in the gas generator shown in FIG. 2, in order to stabilize an operation performance, the second igniter 38*b* and the first igniter 38*a* are simultaneously ignited. However, the second igniter 38*b* is never activated prior to the first igniter 38*a*. That is, a molded article of a gas generating agent 9*b* accommodated in the second combustion chamber 35*b* is burnt at the same time or at a delayed timing of the combustion of a molded article of a gas generating agent 9*a* accommodated in the first combustion chamber 35*a*.

In addition, in the housing 3, a coolant/filter (not shown) for purifying and cooling the combustion gas generated by combustion of a molded article of a gas generating agent (9*a*, 9*b*) is disposed.

Gas discharging ports (26*a*, 26*b*) are closed by a seal tape 27 in order to prevent the outside air from invading. This seal tape 27 is ruptured at the time of discharging gas. The seal tape 27 is to protect a molded article of a gas generating agent from outside moisture, and does not have any influence at all on controlling performance such as the combustion inner pressure and so on.

In the gas generator comprising as above, when the first igniter 12*a* is activated, the transfer charge 16*a* is ignited and burnt, and the flame passes through flame transferring holes 17 in the inner cylindrical member 31 to burn the molded article of a first gas generating agent 9*a* accommodated in the first combustion chamber 35*a*.

When the second igniter 38*b* is activated at the same time or at a delayed timing of activation of the first igniter 38*a*, the transfer charge 39*b* is ignited and burnt, and the flame thereof ignites and burns the molded article of a second gas generating agent 9*b* accommodated in the second combustion chamber 35*b*.

As a result, by adjusting ignition timing of two igniters (38*a*, 38*b*), such as, by activating the second igniter 38*b* after the activation of the first igniter 38*a*, or by activating the first igniter 38*a* and the second igniter 38*b* at the same time, the output (operation performance) of the gas generator can be adjusted optionally, and even under various kinds of circumstances such as a speed of a vehicle and an environmental temperature at a time of collision, an air bag can be inflated most properly in the air bag apparatus described below.

In the gas generator shown in FIG. 2, the respective combustion chambers (35*a*, 35*b*) can adopt molded articles of a gas generating agents (9*a*, 9*b*) different from each other in size. In addition, by varying an accommodated amount of the molded article of the gas generating agent with respect to each combustion chamber (35*a*, 35*b*), an output can be adjusted more precisely. Incidentally, a shape, a composition, a composition ratio, an amount etc. of a molded article of a gas generating agent can be changed to obtain a desired output.

The gas generator for an air bag shown in the FIG. 1 and 2 is accommodated in a module case together with an air bag (bag body) to introduce a gas generated in the gas generator to inflate, thereby being an air bag apparatus.

In this air bag apparatus, the gas generator is activated by the impact sensor detecting the impact to discharge a combustion gas from the gas discharging port in the housing. The combustion gas flows into the air bag, and thereby the air bag inflates to break a module cover and forms a cushion absorbing the impact between a hard structure in the vehicle and an occupant.

EXAMPLE

Examples 1 to 4

Tank combustion tests were conducted using the gas generator shown in FIG. 1 and Table 1 for Examples 1 to 3 and the one shown in FIG. 2 and Table 1 for Example 4, and inner pressure curves were measured. As a molded article of a gas generating agent, the one shown as an example in Embodiment 1 was used. The test results are shown in Table 1.

Comparative Example 1

A tank combustion test was conducted in the same manner as the Examples 1 to 4 using the cylinder-shaped gas generator shown in the FIG. 5 of WO-A 01/40032, and an inner pressure curve was measured. The composition of a molded article of a gas generating agent is same as that of above Embodiments 1 and 2. The results are shown in Table 1.

TABLE 1

|  | Examples | | | Comparative Example | Example |
| --- | --- | --- | --- | --- | --- |
|  | 1 | 2 | 3 | 1 | 4 |
| gas generating agent |  |  |  |  |  |
| outer diameter (mm) | 3.5 | 3.5 | 3 | 7.4 | 4/5 |
| inner diameter (mm) | 1 | 1 | 1 | 0.73 | 1/1 |
| length (mm) | 4 | 4 | 4 | 6 | 4/4 |
| weight (g) | 100 | 95 | 100 | 145 | 80/20 |
| thickness W (mm) | 1.25 | 1.25 | 1.0 | 1.3 | 1.5/2 |
| gas generator |  |  |  |  |  |
| height L (mm) | 75 | 75 | 72 | 200 | 80 |
| diameter D (mm) | 70 | 70 | 70 | 51 | 70 |
| volume (cm$^3$) | 288 | 288 | 277 | 409 | 308 |
| L/D | 1.07 | 1.07 | 1.03 | 3.92 | 1.14 |
| gas discharging port diameter (mm) × number of ports | 2.5 × 36 | 2.5 × 32 | 2.5 × 32 | 2.85 × 48, 2 × 48 | 3.5 × 10, 2.0 × 25 |
| surface area of gas generating agent A (cm$^2$) | 1239 | 1136 | 1357 | 1209 | 1030 |
| area of gas discharging port At (cm$^2$) | 1.767 | 1.571 | 1.571 | 4.57 | 1.748 |
| amount of gas (mol) | 2.4 | 2.28 | 2.4 | 3.5 | 2.4 |
| A/At | 701 | 723 | 864 | 265 | 589 |
| At/amount of gas (cm$^2$/mol) | 0.736 | 0.689 | 0.655 | 1.306 | 0.728 |
| A/amount of gas (cm$^2$/mol) | 516 | 498 | 565 | 345 | 429 |
| evaluation |  |  |  |  |  |
| inner pressure peak time (msec) | 20–24 | 15–19 | 17–21 | 8–12 | 16–20 |
| time to 1/4 (msec) | 45–50 | 45–50 | 48–52 | 25–30 | 45–50 |

Figure 4:
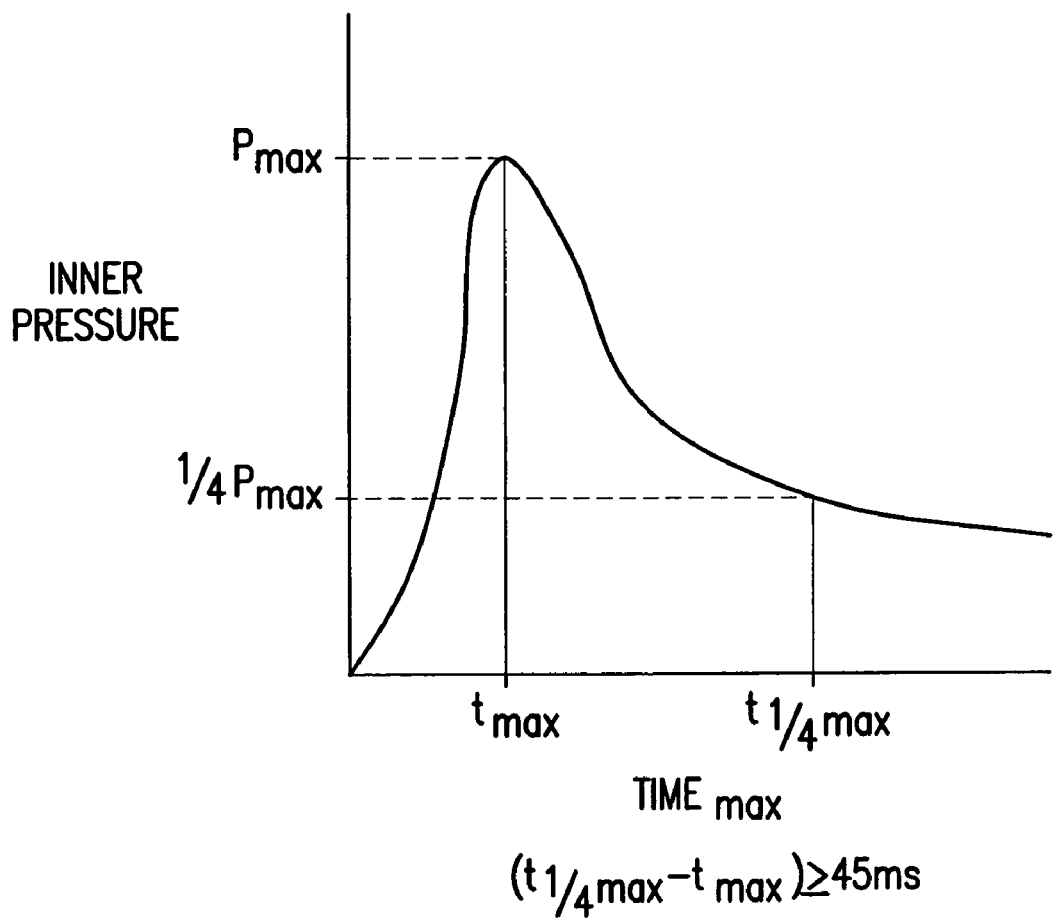
FIG. 4 is a schematic representation of the relationship between the peak inner pressure time in a deployed gas generator and the lowering of the pressure in the gas generator to ¼ the peak pressure.

The time to ¼ (msec) indicates the time (msec) between when the inner pressure of the gas generator has reached its peak and the time when the gas generator has lost pressure so that the peak in the inner pressure curve has become one-fourth as high as it was at the inner peak pressure in the gas generator. This is illustrated schematically in FIG. 4.

The invention claimed is:

1. A gas generator for an air bag, comprising:
a housing having a gas discharging port;
ignition means to be activated upon an impact; and
a molded article of a gas generating agent to be ignited and burnt by the ignition means for generating a combustion gas, wherein at least one of three requirements selected from the following (a), (b) and (c) are met such that a time, between a peak of an inner pressure generated in the gas generator and subsequent lowering of the inner pressure to one-fourth its peak value, is not less than 45 milliseconds when the gas generator is activated at room temperature:
(a) an internal volume of a gas generator is 200 to 400 cm$^3$;
(b) a ratio (L/D) of an axial length (L) of the gas generator to a diameter (D) of the gas generator is 0.6 to 1.5; and
(c) an amount of gas generated by combustion of the molded article of a gas generating agent is 1.5 to 4.5 mol.

2. The gas generator for an air bag as claimed in claim 1, wherein the axial length (L) of the gas generator is 50 to 100 mm.

3. The gas generator for a passenger side air bag as claimed in claim 1, wherein the housing includes a diffuser shell having the gas discharging port and a closure shell, and a ratio of an axial length (L2) of the closure shell to an axial length (L1) of the diffuser shell is 0.5 to 1.5.

4. The gas generator for a passenger side air bag as claimed in claim 1, wherein the housing includes a diffuser shell having the gas discharging port and a closure shell, and a ratio (D2/D1) of a diameter (D2) of the closure shell to a diameter (D1) of the diffuser shell is 0.8 to 1.2.

5. The gas generator for an air bag as claimed in claim 1, wherein the housing includes a diffuser shell and a closure shell that are provided with a flange extending outwardly in a radial direction formed at open ends of circumferential walls thereof, respectively.

6. The gas generator for an air bag as claimed in claim 1, wherein a minimum thickness (W) of the molded article is 0.8 to 2.2 mm.

7. The gas generator for an air bag as claimed in claim 1, wherein the molded article has a perforation.

8. The gas generator for an air bag as claimed in claim 1, wherein the housing includes a plurality of molded articles having a total surface area (A) and is formed with a plurality of gas discharging ports, and a ratio (A/At) between the total surface area (A) and a total area (At) of the plurality of gas discharging ports is 500 to 1,000.

9. The gas generator for an air bag as claimed in claim 1, wherein the housing includes a plurality of molded articles and is formed with a plurality of gas discharging ports, and a ratio between a total area (At) of gas discharging ports and an amount of gas generated by combustion of the plurality of molded articles is 0.3 to 1.0 $cm^2$/mol.

10. The gas generator for an air bag as claimed in claim 1, wherein the housing includes a plurality of molded articles, and a ratio between a total surface area (A) of molded articles and an amount of gas generated by combustion of the molded articles is 350 to 650 $cm^2$/mol.

11. An air bag apparatus, comprising:
a gas generator;
an impact sensor detecting an impact to activate the gas generator;
an air bag; and
a module case accommodating the air bag, wherein the gas generator for an air bag is the gas generator according to claim 1.

12. A method of generating a gas from a gas generator for an air bag, comprising:
providing a housing having a gas discharging port;
providing ignition means within the housing for activating the gas generator upon an impact;
providing, within the housing, a molded article of a gas generating agent to be ignited and burnt by the ignition means for generating a combustion gas;
meeting at least one of three requirements selected from the following (a), (b) and (c); and
adjusting a time, between a peak of an inner pressure generated in the gas generator and subsequent lowering of the inner pressure to one-fourth its peak value, is not less than 45 milliseconds when the gas generator is activated at room temperature:
(a) an internal volume of a gas generator is 200 to 400 $cm^3$;
(b) a ratio (L/D) of an axial length (L) of the gas generator to a diameter (D) of the gas generator is 0.6 to 1.5; and
(c) an amount of gas generated by combustion of the molded article of a gas generating agent is 1.5 to 4.5 mol.

13. A method according to claim 12 of generating a gas, wherein the step of providing a molded article further includes:
providing the molded article having a minimum thickness (W) of 0.8 to 2.2 mm.

14. A method according to claim 13 of generating a gas, wherein the step of providing a molded article further includes:
providing the molded article having a perforation.

15. A method according to claim 12 of generating a gas, further comprising:
providing, within the housing, a plurality of molded articles having a total surface area (A);
providing a plurality of gas discharging ports in the housing; and
adjusting a ratio (A/At) between the total surface area (A) and a total area of gas discharging ports (At) to be 500 to 1,000.

16. A method according to claim 12 of generating a gas, further comprising:
providing, within the housing, a plurality of molded articles;
providing a plurality of gas discharging ports in the housing; and
adjusting a ratio (At/amount of gas) between a total area (At) of gas discharging ports and an amount of gas generated by combustion of the molded articles to be 0.8 to 1.0 $cm^2$/mol.

17. A method according to claim 12 of generating a gas, further comprising:
providing, within the housing, a plurality of molded articles; and
adjusting a ratio (At/amount of gas) between a total surface area (A) of molded articles and an amount of gas generated by combustion of the molded articles to be 350 to 650 $cm^2$/mol.

* * * * *